June 14, 1938. H. THÜRLINGS 2,120,820
METHOD FOR FILLING SOFT CENTER CONFECTIONS AND THE LIKE
Filed Sept. 16, 1936

INVENTOR.
HERMANN THÜRLINGS
BY
ATTORNEYS.

Patented June 14, 1938

2,120,820

UNITED STATES PATENT OFFICE 2,120,820

METHOD FOR FILLING SOFT CENTER CONFECTIONS AND THE LIKE

Hermann Thürlings, Viersen, Germany, assignor to Baker Perkins Company, Inc., Saginaw, Mich., a corporation of New York Application September 16, 1936, Serial No. 101,116
In Germany October 25, 1935

1 Claim. (Cl. 107—54)

This invention relates to a novel method for making filled confections and the like, which are manufactured by simultaneously forming an endless tube of sugar, feeding the tube along an extruding nozzle, and simultaneously feeding the filling material into the hollow center of the tube. The filled tube is then cut into pieces and stamped in dies of various patterns, which operation pinches shut the ends of the severed pieces of filled confection.

It has heretofore been considered essential, since the outer sugar tube was formed around and fed along the extruding tube at substantially uniform speed, that the filling also should be fed into the tube at a uniform rate. The machines heretofore used for this purpose in general consisted of a reservoir for the fluid filling material from which, by gravity, fluid pressure, or a conveyor screw, the material was fed through the extruding tube into the sugar tube. These mechanisms were subject to certain disadvantages, inherent in their method of operation. For example, the rate of feed could not readily be proportioned to fillings of different consistencies, that is, to light and thin, as well as thick plastic materials. In handling thin liquid fillings the rate of feed was changed by adjusting the height of the supply reservoir, and in the case of heavy filling materials requiring pressure for extrusion the pressure on the fluid in the reservoir was varied. Furthermore, in machines of this latter kind the supply reservoir could not be refilled without interrupting the feed by releasing the air pressure.

This invention overcomes the above mentioned and other objections to the method and apparatus heretofore used by a novel method of intermittent feed. This method permits the use of a novel piston pump to feed the filling material, embodying novel apparatus to vary the stroke of the pump for adjusting the rate of feed of filling material, and other valuable features which could not be used heretofore. This apparatus, which is described generally herein for better understanding of the method, forms the subject-matter of a divisional application for United States patent, Serial No. 178,077, filed December 4, 1937.

Further objects and features of the invention will be apparent in the course of the following description.

In the accompanying drawing, in which like numerals designate like parts,

Figure 1:
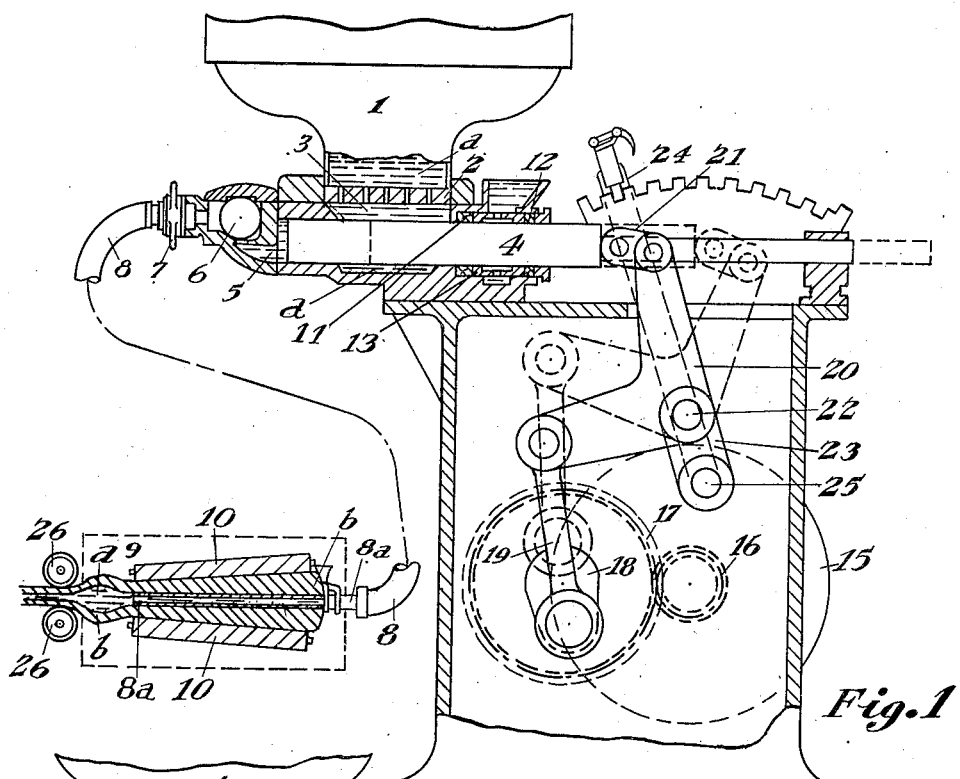
Fig. 1 is a part-diagrammatic sectional side elevation of a confection-extruding machine embodying the invention, showing the pump piston and its associated mechanism in adjusted position for delivering a large quantity of filling material.

Referring to the drawing, the apparatus shown consists of a supply hopper or reservoir 1, from which filling material a for the centers of candies is delivered through a protective grille 2 into a pump housing 3. Within the pump housing is a piston 4, centered for reciprocation in a cylinder 5. In its withdrawn position piston 4 is clear of the cylinder but is held clear of the walls of the housing 3 so that filling material can flow around it on all sides. Cylinder 5 communicates with the pump housing at its inner end and at its outer end is provided with a discharge check valve 6. Connected to the discharge opening at valve 6, a coupling 7 conveys the filling from the pump into tube 8 (see Fig. 1). Tube 8 is connected to an extruding tube or nozzle 8a in receptacle 9, shown diagrammatically in dotted lines, of a tube forming device of known type. A plurality of rollers 10 are journaled in the receptacle 9 with their peripheral faces locating the surface of a cone. Rollers 10 are rotated by means (not shown) to mold the sugar or other material b around the tube 8a to enclose the filling material a extruded from it to form the hard outside shell of the finished product. Coating sugar b is placed in the receptacle 9, and in known manner is rolled and worked into an endless tube enveloping the extruding tube 8a, and is progressively rolled down to a reduced outside diameter and urged endwise from the discharge end of the extrusion tube by the action of rollers 10.

Figure 2:
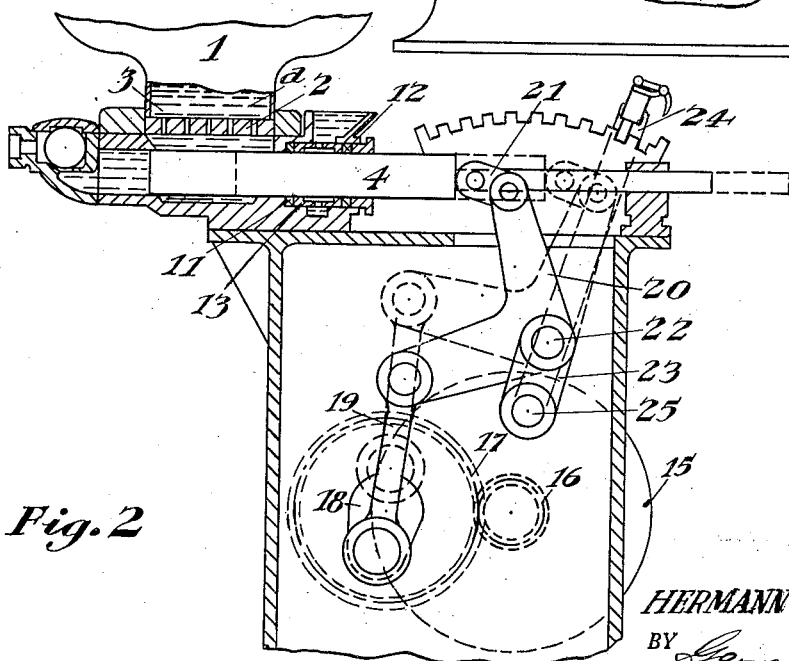
Fig. 2 is a side elevation corresponding to Fig. 1, showing the extruding mechanism adjusted to deliver the smallest possible quantity of filling material.

The improved pump is driven from a belt pulley 15, driven by a motor (not shown) through spur gears 16, 17, a crank 18, a connecting rod 19, a bell crank lever 20, and a link 21 coupled to the piston. The pivot pin 22 of the bell crank 20 is mounted upon a lever 23. Lever 23 and a lever 24 fixed thereto are journaled on a fixed shaft 25. By shifting the lever 24, the position of pivot 22 can be adjusted so that the distance which the piston 4 travels into the cylinder 5 can be altered, thus varying the effective stroke of the piston and accordingly changing the rate at which filling material is fed to the tube 8. Fig. 1 shows the drive mechanism set for the maximum stroke of the piston and the greatest delivery of filled material, while Fig. 2 shows the pivot 22 adjusted for a minimum rate of delivery, the frequency of the pump reciprocation being the same for both settings.

In operation the outer tube $b$ of coating sugar receives filling material intermittently with each stroke of the piston. Consequently the speed and stroke of the pump are adjusted so that its average delivery is appropriate to the internal diameter of the outer sugar tube $b$ and the rate of feed of that tube from the discharge end of the extrusion nozzle $8a$. The filled sugar tube as it leaves the receptacle 9 presents a succession of nodes or sections which have been overfilled, alternately with empty or slack-filled sections. The elasticity of the outer sugar tube may be sufficient to equalize the bulges partly or entirely, or if desired, pressure means for reducing the nodes may be employed. For example, a plurality of rollers 26, journaled transversely of the material, may be located at a short distance beyond the point of delivery of the filled tube from receptacle 9, as shown in Fig. 1. Rollers 26 work the bulged sections down to the desired diameter, forcing the excess filling into the unfilled portions of the tube, and producing a filled tube of uniform diameter ready for cutting and stamping into finished pieces.

While I have shown and described a method of making confections, the invention may be used advantageously in the handling of other plastic materials, such as rubber, wax, or gum. The terms "confection" and "sugar" are intended here to include such other materials, and the method may be used with them without departing from the scope of the appended claim. Likewise, while I have shown and described a specific apparatus for the practice of my improved method, its essential advantages may be realized with pump mechanisms of other constructions especially suited to particular materials being handled.

Having thus described my invention, what I claim and desire to secure by Letters Patent is:

The process of producing a continuous filled confection tube consisting of forming said tube, feeding it lengthwise, and simultaneously extruding into the center of said tube plastic or fluid filling material intermittently to produce nodes of filled tube alternating with empty or slack-filled tube sections, and subsequent to said filling passing said tube through a pressure device, whereby the nodes are squeezed down to a section of constant diameter, and the displaced filling material is forced into said empty or slack-filled sections of the tube.

HERMANN THÜRLINGS.